Patented July 11, 1933

1,917,835

UNITED STATES PATENT OFFICE

ERNEST F. GRETHER, OF MIDLAND, MICHIGAN, ASSIGNOR TO THE DOW CHEMICAL COMPANY, OF MIDLAND, MICHIGAN, A CORPORATION OF MICHIGAN

DIRECT-DEVELOPED AZO DYES

No Drawing.   Application filed February 9, 1931.   Serial No. 514,707.

The present invention is concerned with azo dyes of the direct-developed type which may be produced by coupling diazotized 3.4-dihalo-anilines or their derivatives into azo dye components, particularly by coupling diazotized 3.4-dichloro-aniline into such.

It is known that azo dyes which are fast to light and washing are produced by coupling diazotized aromatic amines into 2.3-hydroxynaphthoic acid arylides. I have found that diazotized 3.4-dihalo-anilines may be coupled into azo dye components of the abovesaid general type, e. g. hydroxynaphthoic acid arylides of amino-ethers, or substitution products thereof, to form new and useful water-insoluble azo dyes of excellent fastness to light, washing and bleaching.

My invention, then, consists of the methods, steps and new products hereinafter fully described and particularly pointed out in the claims, the following description setting forth several forms of product and various ways in which the principle of my invention may be used.

The herein described new azo dyes dye cotton and other fibers directly in very fast and clear shades. They may be prepared by coupling the aforesaid diazo components into the abovementioned azo dye components in any of the ordinary ways, e. g. dyes may be applied by developing on the fiber, by printing a diazo solution upon padded goods, by using the nitrosamine salts of the corresponding bases, or may be prepared in substance for use as pigments. Mordanting or other auxiliary treatment for promoting the absorption of the dye by the fiber, or after-treatment with metallic salts, such as chromium, copper, or aluminum salts, for fixing the dye, modifying its color tone, or increasing the fastness of the dye, may be optionally employed in conjunction with the dyeing operation without departing from the spirit of my invention which is intended to include not only the dyes themselves but also material dyed therewith.

The following specific examples, representative of the dyes prepared, illustrate certain of the several ways in which my invention may be carried out:—

Example 1

Cotton fibers were impregnated with an aqueous alkaline solution of 4-(2'.3'-hydroxynaphthoylamino)-2-chloro-diphenyl-ether. The impregnated fibers were then rinsed in water and immersed in a dilute aqueous sodium carbonate solution to which had been added a diazo solution prepared from 3.4-dichloro-aniline. The dye which developed on the fiber had a pimento color, the formula being,

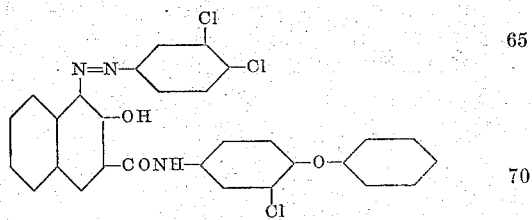

Example 2

By similar procedure as described in Example 1, the same diazo component was coupled into 1-(2'.3'-hydroxynaphthoylamino)-3-chloro-4.6-di-ethoxy benzene. The color of the dye on the fiber was dark pimento, such dye having the formula,

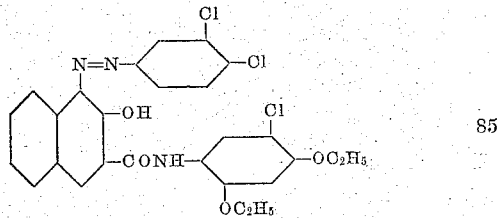

Example 3

Similarly, the same diazo component was coupled into 4.4'-di(2.3-hydroxynaphthoylamino)-dipheneylether. The dye which developed on the fiber, was scarlet in color, the formula being,

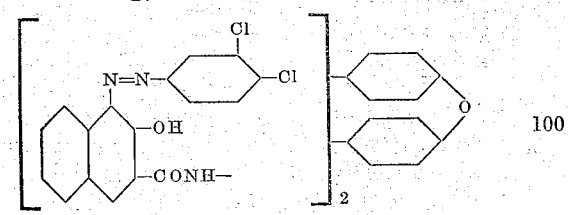

The "Standard Color Chart of America", (Ed. 1928), issued by "The Textile Color Card Association of the United States, Inc." is used to designate the color of the above mentioned dyes.

While in the examples, cotton fibers have been referred to as the material to be dyed with the herein described new azo dyes, other natural or synthetic fibers may likewise be dyed therewith, such as wool, silk, rayon and the like.

Furthermore, I do not limit my invention to the use of the specifically aforementioned dye intermediates. As coupling components may be used arylides prepared from other amino derivatives of aryl, aralkyl, or alkyl ethers, such as other diphenylethers, e. g. 2-amino-diphenylether, phenylmethylethers, or phenylbenzylethers, which may be further substituted by groups such as halogen, nitro, ether, and the like.

In résumé, my invention concerns azo dyes produced by coupling diazotized 3.4-dihalo-anilines, or substituted derivatives thereof, into hydroxynaphthoic acid arylides of amino ethers, such dyes having the following general formula,

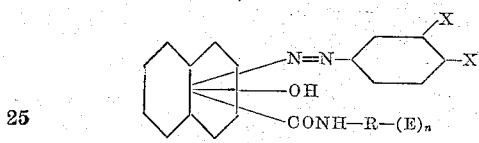

wherein X respresents a halogen other than iodine, R an aromatic hydrocarbon residue containing at least one ether group E, n is an integer equalling the number of E groups, and wherein the several groups and residues may be further substituted.

Other modes of applying the principle of my invention may be employed instead of the one explained, change being made as regards the details, provided the steps or ingredients stated by any of the following claims or the equivalent of such be employed.

I therefore particularly point out and distinctly claim as my invention:—

1. The method of making an azo dye which comprises coupling diazotized 3.4-di-halo-aniline with a hydroxynaphthoic acid arylide formed through condensing a hydroxynaphthoic acid with an amino-aromatic ether selected from the class consisting of amino-diaryl ethers, amino-aryl-alkyl ethers, and amino-aryl-aralkyl ethers, the aromatic nuclei of such ether being of the benzene series and the amino group of the ether being attached to a benzene nucleus thereof.

2. The method of making an azo dye which comprises coupling diazotized 3.4-di-halo-aniline with a 2.3-hydroxynaphthoic acid arylide formed through condensing 2.3-hydroxynaphthoic acid with an amino-aromatic ether selected from the class consisting of amino-diaryl ethers, amino-aryl-alkyl ethers, and amino-aryl-aralkyl ethers, the aromatic nuclei of such ether being of the benzene series and the amino group of the ether being attached to a benzene nucleus thereof.

3. The method of making an azo dye which comprises coupling diazotized 3.4-di-chloro-aniline with a 2.3-hydroxynaphthoic acid arylide formed through condensing 2.3-hydroxynaphthoic acid with an amino-aromatic ether selected from the class consisting of amino-diaryl ethers, amino-aryl-alkyl ethers, and amino-aryl-aralkyl ethers, the aromatic nuclei of such ether being of the benzene series and the amino group of the ether being attached to a benzene nucleus thereof.

4. The method of making an azo dye which comprises coupling diazotized 3.4-di-chloro-aniline with a 2.3-hydroxynaphthoic acid arylide formed through condensing 2.3-hydroxynaphthoic acid with a halogenated amino-aromatic ether selected from the class consisting of nuclear halogenated amino-diaryl ethers, nuclear halogenated amino-aryl-alkyl ethers, and nuclear halogenated amino-aryl-aralkyl ethers, the aromatic nuclei of such ether being of the benzene series and the amino group of the ether being attached to a benzene nucleus thereof.

5. The method of making an azo dye which comprises coupling diazotized 3.4-di-chloro-aniline with a d-(2.3-hydroxynaphthoic acid arylide) formed through condensing two molecules of 2.3-hydroxynaphthoic acid with one molecule of a diamino-diaryl ether, the aromatic nuclei of said ether being of the benzene series.

6. As a new compound, an azo dye produced by coupling diazotized 3.4-dichloro-aniline with a hydroxynaphthoic acid arylide of an amino-aromatic ether of the benzene series.

7. As a new compound, an azo dye having the general formula,

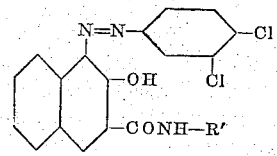

wherein R' represents an aromatic residue of the benzene series, which residue is further substituted by at least one substituent selected from the class consisting of alkoxy, phenoxy, and benzyloxy groups.

8. As a new compound, an azo dye having the general formula,

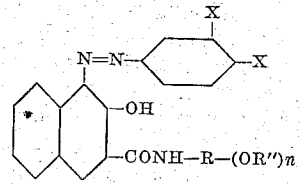

wherein X represents a halo group, R represents an aromatic residue of the benzene series, R" represents a residue selected from the group consisting of alkyl, phenyl, and benzyl residues, and n is the number of OR" substituents linked with R.

9. As a new compound, an azo dye having the general formula,

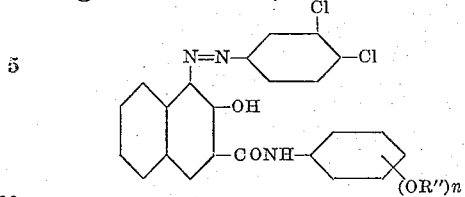

wherein R″ represents a residue selected from the group consisting of alkyl, phenyl, and benzyl residues, and n is the number of OR″ substituents.

10. As a new compound, an azo dye produced by coupling diazotized 3.4-dichloro-aniline with a (2′.3′-hydroxy-naphthoylamino)-diphenylether.

11. As a new compound, an azo dye having the following formula,

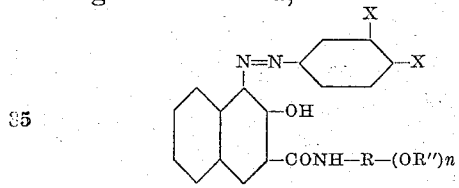

12. As a new compound, an azo dye having the general formula,

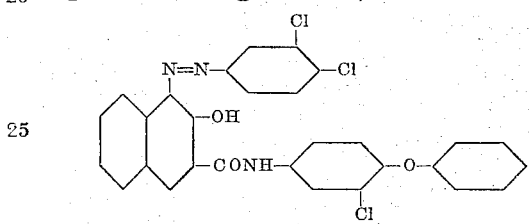

wherein X represents a halo group, R represents an aromatic residue of the benzene series, R″ represents a residue selected from the group consisting of alkyl, phenyl, and benzyl residues, and n is the integer 1 or 2.

13. As a new compound, an azo dye having the general formula,

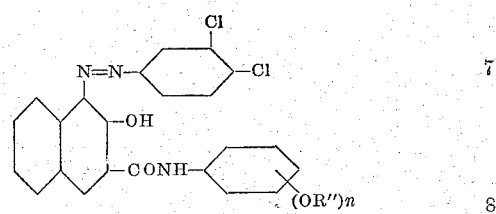

wherein R″ represents a residue selected from the group consisting of alkyl, phenyl, and benzyl residues, and n is the integer 1 or 2.

14. Fiber dyed with a dye as claimed in claim 10.
15. Fiber dyed with a dye as claimed in claim 11.
16. Fiber dyed with a dye as claimed in claim 8.
17. Fiber dyed with a dye as claimed in claim 9.
18. Fiber dyed with a dye as claimed in claim 12.
19. Fiber dyed with a dye as claimed in claim 13.
20. Fiber dyed with a dye as claimed in claim 6.
21. Fiber dyed with a dye as claimed in claim 7.

Signed by me this 4 day of February, 1931.

ERNEST F. GRETHER.